United States Patent Office 3,605,646
Patented Sept. 20, 1971

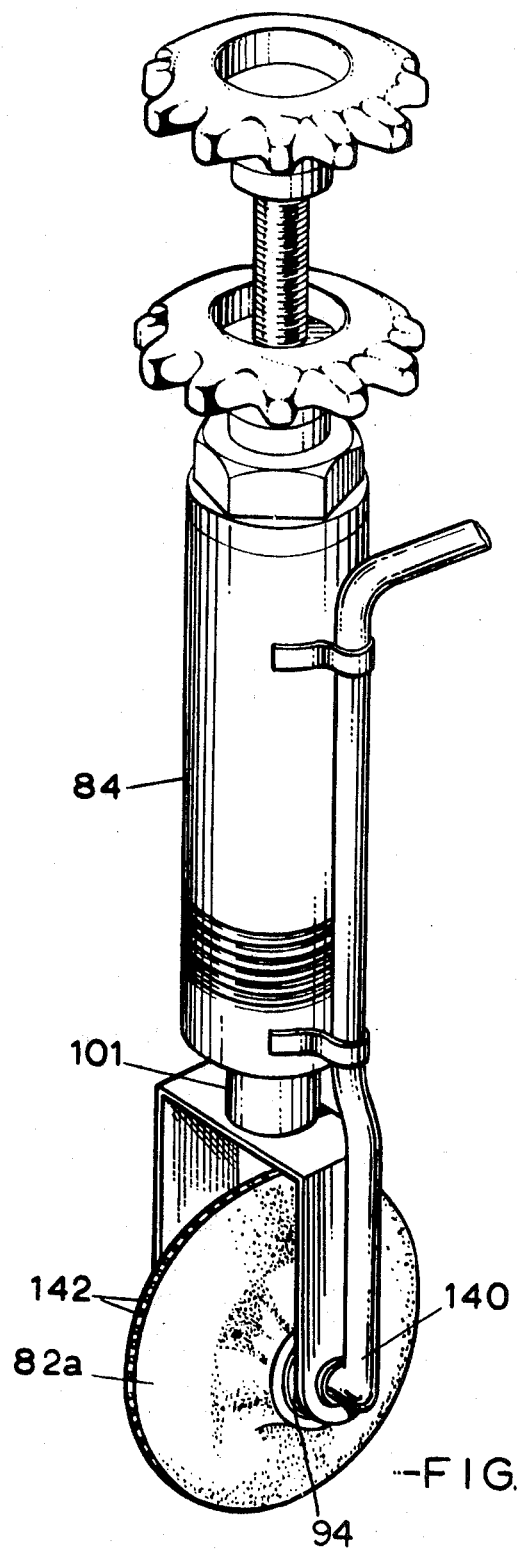

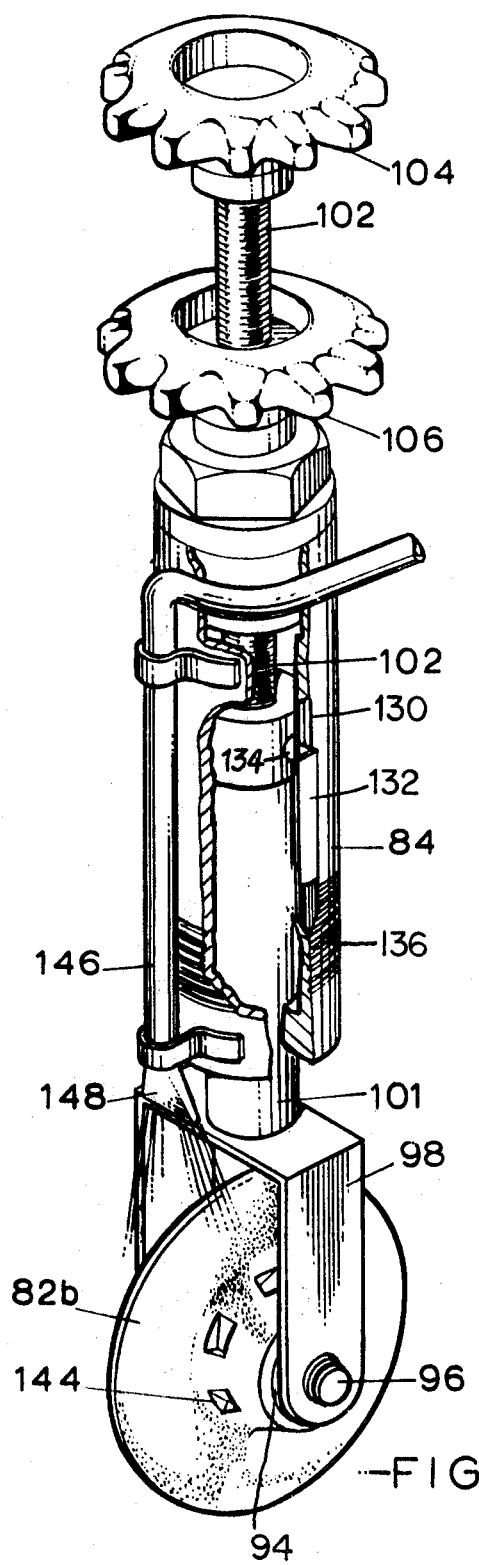

3,605,646
DOUGH MANIPULATION
John Jolly, Nelson, near Burnley, and Neil Clyde, Pike Hill, Burnley, England, assignors to Tweedy of Burnley Limited, Burnley, England
Filed Feb. 3, 1969, Ser. No. 795,937
Int. Cl. A21c 11/00
U.S. Cl. 107—9
13 Claims

ABSTRACT OF THE DISCLOSURE

Apparatus for folding an elongated cylindrically dough shaped mass into a sinuous formation comprising means for peripherally scoring the mass at periodic intervals at its length, a conveyor for carrying the dough mass beneath the scoring means to a conveyor discharge end for cross-panning the dough comprising a sloping, fluidised bed over which the dough mass passes in lengthwise fashion, and dough mass retarding means comprising a rotatable wheel having a fluidised surface for slowing movement of the dough mass at its center and fluidised end wall surfaces arranged to retard movement of the mass at its ends whereby portions of the dough mass intermediate its center and ends fold inwardly to produce a mass of compressed W-shaped configuration.

---

This invention is concerned with the manipulation of dough, more especially in breadmaking—although it could be used with other kinds of dough (e.g. plastics dough). In breadmaking, the dough is rolled on a dough moulder into a cylindrical shape, and for so-called "cross-panned" bread, this cylinder has to be folded into a plurality of shorter cylinders, which are then placed in a pan with their lengths across the width of the pan. To keep pace with the throughput of a modern bakery, it is desirable that this "cross-panning" shall be done automatically.

The object of this invention is to provide a method of, and apparatus for, manipulating dough, which is particularly adapted for automatic "cross-panning."

According to this invention in a dough manipulating process an elongated piece of dough is retarded near its ends and at an intermediate position to give it a sinuous formation, as it travels in a direction at right angles to its own longitudinal axis, the intermediate retardation being produced by a wheel rotatable about an axis substantially parallel with the aforesaid longitudinal axis of the dough-piece.

According to a preferred feature of the invention, dough folding apparatus comprises means for feeding an elongated dough piece in a direction substantially at right angles to its own longtiudinal axis, means for "engaging" the ends of a dough piece and a wheel mounted for rotation about an axis substantially parallel with the aforesaid longitudinal axis of the dough piece, the roller being located between the means for "engaging" the ends of the dough piece and in the path of movement of the dough piece.

Reference has just been made to means for "engaging" the dough piece. It is to be understood that the term "engaging" when used in this specification to describe interaction between a part of the apparatus and a dough piece does not necessarily imply actual physical contact with the dough. This is because certain parts of the apparatus may be fluidised—as will be explained in detail—so that an air film is created between those parts and the dough to facilitate manipulation of the dough.

Figure 1:
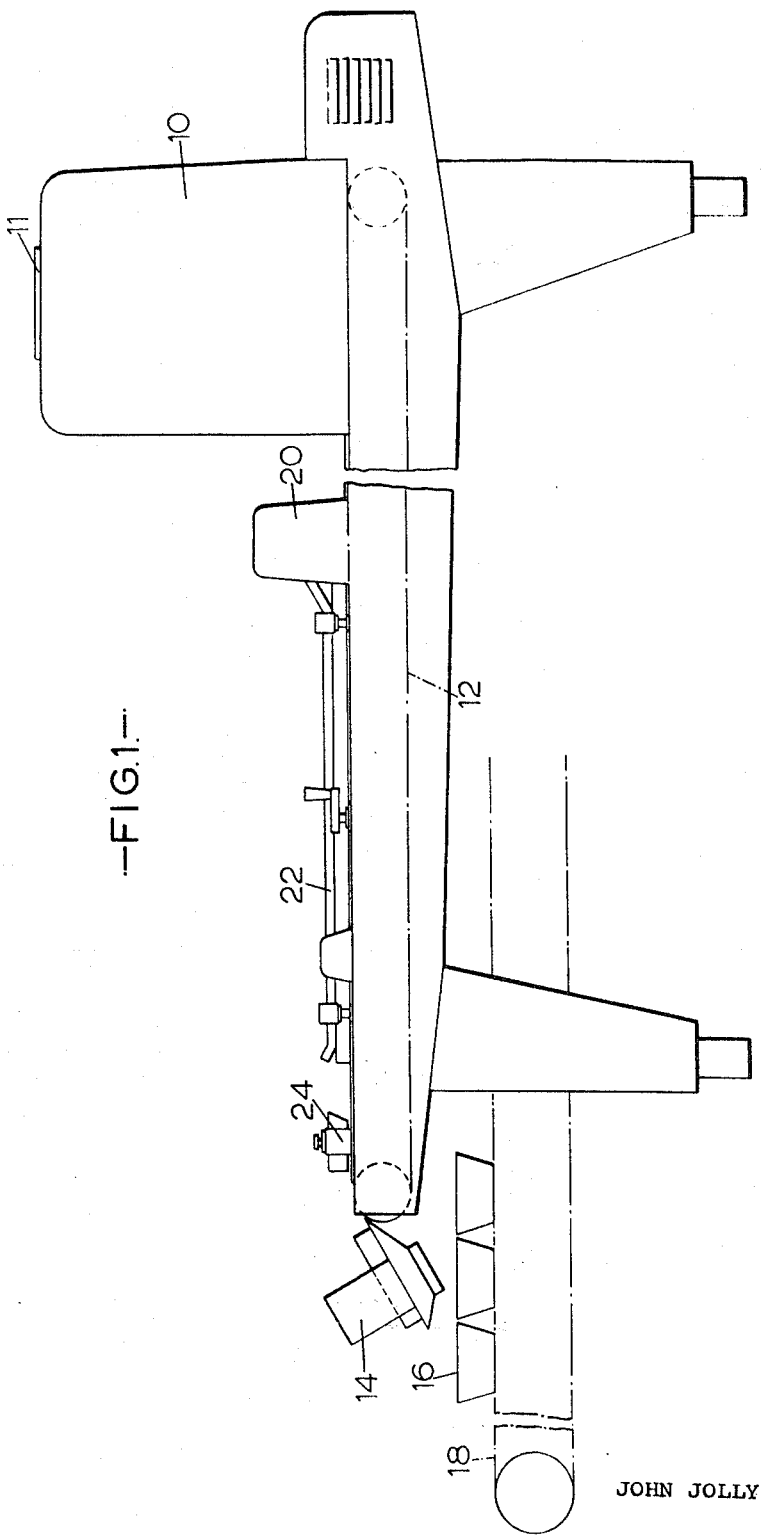
Figure 2:
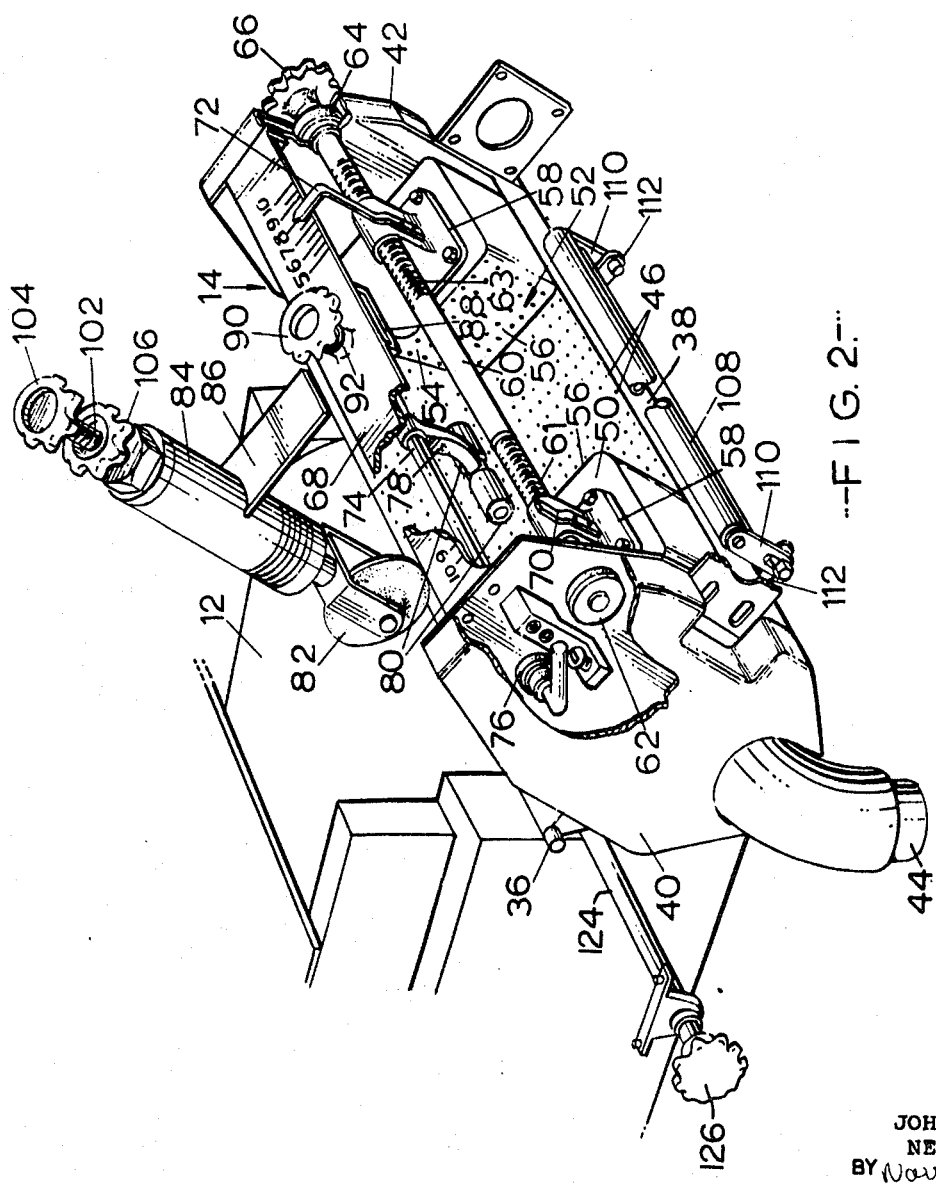
Figure 3:
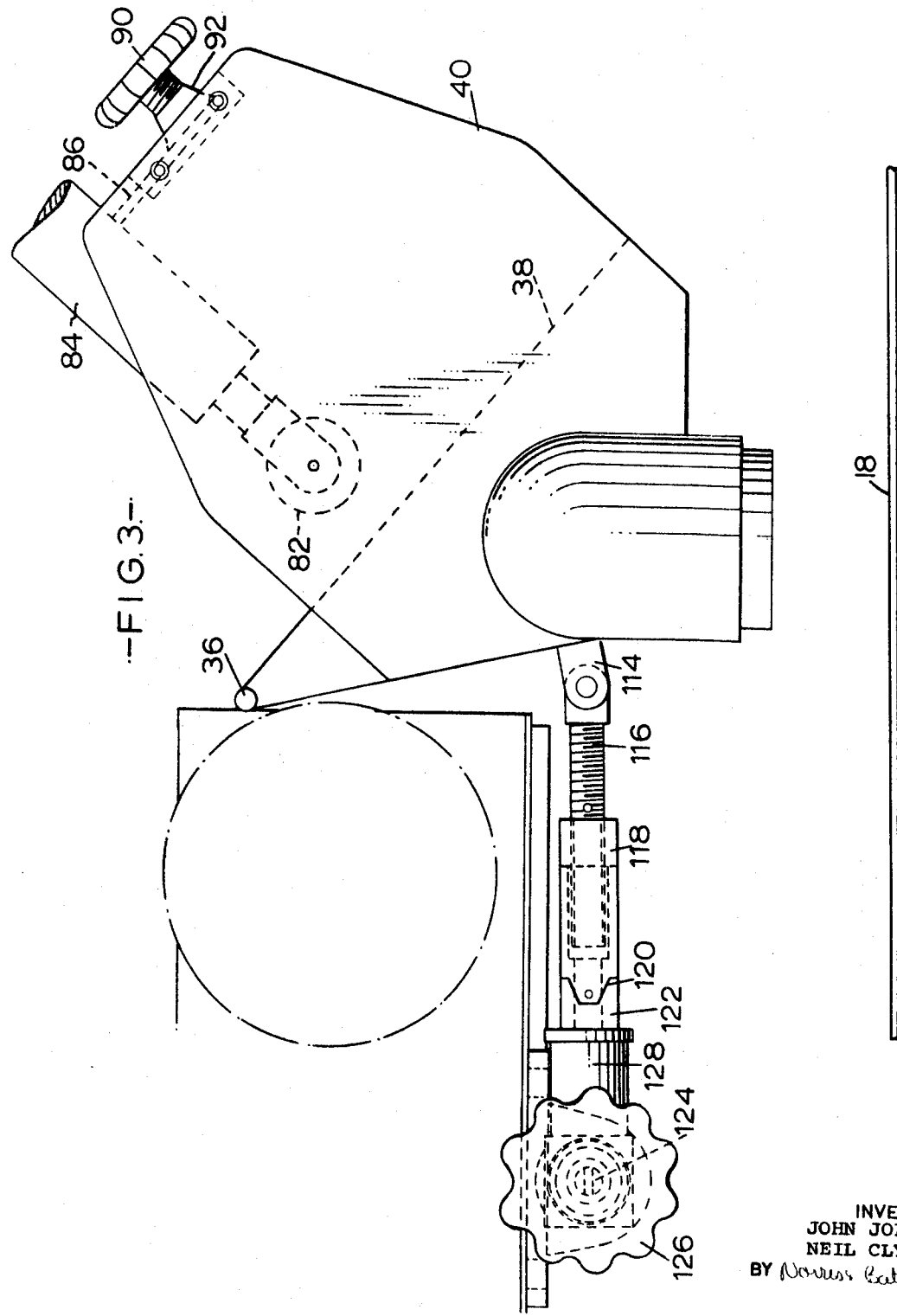
Figure 4:
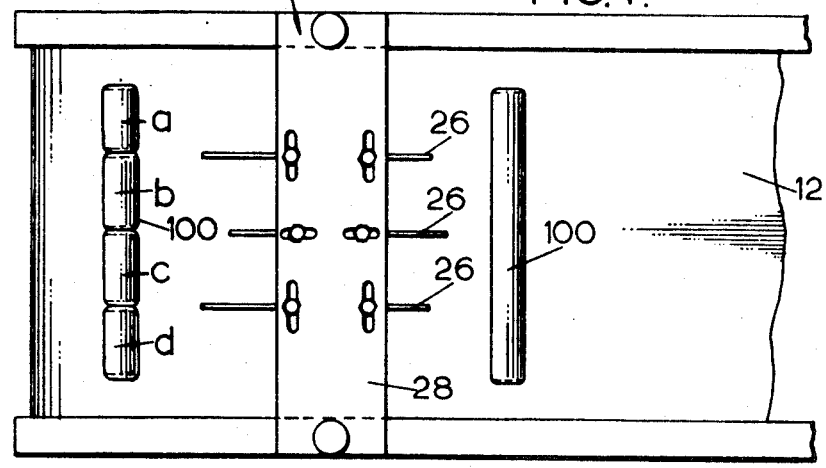
Figure 5:
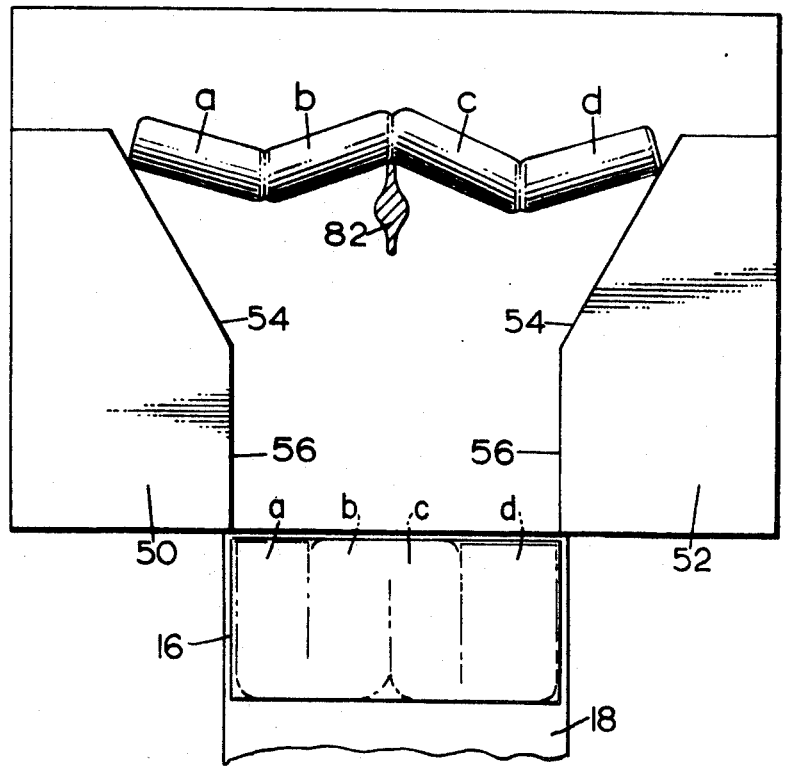

One construction of apparatus in accordance with the invention and its method of use will now be described by way of example only, with reference to the accompanying drawings in which:

FIG. 1 is a diagrammatic side view of a dough moulding machine,
FIG. 2 is a perspective view partly in section and partly exploded of a dough folding apparatus,
FIG. 3 is a side view of the apparatus shown in FIG. 2,
FIG. 4 is a diagrammatic plan view of the dough moulding machine showing a method of scoring a dough piece,
FIG. 5 is a diagrammatic view of the dough folder showing its method of operation,
FIG. 6 is a perspective view of an alternative wheel arrangement, and
FIG. 7 is a perspective view of another alternative wheel arrangement.

Referring to FIG. 1, there is illustrated a dough moulder of a type which is well known in the breadmaking art, and which therefore need not be described in detail. Dough in lump form is fed into a headstock 10 through an opening 11, and within the headstock it passes between rollers (not shown) which squeeze the dough out into a flat sheet. This dough then travels along an endless belt conveyor 12 towards the rear end of the moulder, where it passes through a dough folder 14 before dropping into a pan 16 on a pan conveyor 18.

During its travel along the belt 12, the sheet of dough first passes under a chain mail coiler 20 which rolls the sheet of dough into an elongated cylindrical shape. This rolled dough piece is then carried under a pressure board 22 which gradually approaches the surface of the conveyor belt 12, so that the dough is caused to roll tighter. The effect of the sheeting and rolling is to produce a cellular structure in the dough, each cell being somewhat elongated in the direction of the longitudinal axis of the dough cylinder.

For some qualities of bread, it is necessary to fold the dough cylinder into a plurality of pieces (usually four) of equal length and then to position these in the pan with their lengths across the width of the pan. The elongated cells of the dough then extend laterally of the pan and this is desirable, because when the loaf is baked and cut, it will have a smooth texture. The process of folding the dough cylinder and turning the separate pieces through 90° as they are placed in the pan is known in the trade as cross-panning. The dough folder 14 is provided to carry out cross-panning automatically.

A scorer 24 is fitted across and above the conveyor belt 12 (see FIG. 5). This scorer has three blades 26, which project downwardly from a cross-beam 28, the blades being adjustable along the beam so that their lateral spacing on the moulder can be varied. This enables the scorer to be adjusted to suit dough pieces of different lengths.

The blades 26 may be adjustable vertically, but in any case, they are pre-set so that they are clear of the belt 12, but will dig into the roller dough piece. As the dough piece passes the scorer, it rolls under the blades 26 and in so doing it is "necked" (i.e. the blades do not cut through the dough, but they cut slits into it). From then on it is possible to distinguish four small dough pieces joined together end-to-end, but defined lengthwise by the necks.

The dough folder 14 is a self contained unit, and is pivotally mounted on the framework of the dough moulder, the pivoted axis being indicated at 36. The folder has a bed 38, which is hollow and two fixed end chambers 40 and 42, the insides of which are in communication with the inside of the bed 38. An air inlet pipe 44 is connected to the chamber 40, and there is a power driven fan (not shown) which supplies filtered air under pressure to the insides of the chambers 40 and 42 and the bed 38 via the pipe 44. The top surface of the bed 38 is formed with small holes 46 (say 1/16 inch diameter at ½ inch rank and file spacings) so that when air is supplied under pressure to the interior of the base 38, it escapes through the holes 46. If a solid object, such as a piece of dough is placed on the bed, the air escaping from the holes under it spreads out and forms a thin film between the object and the surface of the bed. This air film prevents physical contact between the object and the bed and is referred to as "fluidisation." It has been found that a pressure of 1 pound per square inch above atmospheric pressure is adequate.

The top surface of the bed 38 (i.e. the surface which has the holes 46 and over which the dough piece slides) is made of plastic material, but the other walls of the bed are made of metal.

Two side boxes 50 and 52 are provided, and these are adapted to "engage" with the ends of a dough piece traveling down the inclined bed 38. As is made clear in FIG. 6, the inside faces of the side boxes have converging portions 54 and parallel portions 56.

The boxes 50 and 52 are made of stainless steel and their inside faces are formed with small holes similar to the holes in the top of the bed.

Each side box 50 or 52 rests on the bed 38, and has a top bracket 58 which includes an internally screwthreaded part engaging a threaded part 61 or 63 of an adjusting shaft 60. The latter is mounted transversely of the folder in bearings 62 and 64 in the end chambers 40 and 42. At one side of the machine, the shaft 60 projects outside the chamber 42, and a knob 66 is fixed on it. The screw threaded parts 61 and 62 are of opposite hand, so that when the shaft 60 is turned, the bosses 50 and 52 are moved towards or away from each other. The adjusting shaft 60 therefore provides a means for manual adjustment of the spacing of the side boxes 50 and 52. A bar 68 bridges the tops of the end chambers 40 and 42, and pointers 70 and 72 fixed on the brackets 58 co-operate with scales marked on the bar 68 to give a visual indication of the spacing between the side boxes.

A transverse rod 74 supported in bearings 76 at each end, carries a depending central arm 78 on which are supported two freely rotatable top rollers 80. These rollers are intended to engage with the top of a dough piece as it slides down the top surface of the bed 38, and besides their facility for rotation about their own axes, they can turn as a unit with the arm 78, by rotation of the rod 74 in its bearings. Therefore although the top rollers 80 are useful to control the passage of the dough piece, they do not exercise any retardational force on the dough piece.

A centre wheel 82 which is adapted to "engage" and retard the centre portion of a dough piece, as will be further described is carried by a cylinder 84 which has a tongue 86 engageable in a pocket 88 under the bar 68. In FIG. 2, the cylinder 84 is shown in an exploded position with its tongue 86 out of the pocket 88, but it will be understood that in practice this tongue is normally in the pocket. A locking screw with a knob 90 engages in a screw-threaded boss 92 on the bar 68, and by tightening this screw, the tongue 86 can be locked to the bar 68. This arrangement provides a means of locating the roller in a preselected position along a path of adjustment parallel with the top face of the bed 38.

The roller 82 itself is made of plastics material, and is journalled on ball bearings 94 carried by an axle 96. The latter is supported by the arms of a U-shaped bracket 98 fixed to the lower end of a ram 101 which is slidable within the cylinder 84. (The internal arrangement of the cylinder 84 is shown in FIG. 8.)

The ram 101 is bored at its upper end and internally screw threaded to receive a screwed rod 102 which passes out through the top of the cylinder 84, and has a knob 104 at its top end. By rotating the rod 102, it is possible to raise or lower the ram 101 and in this way the perpendicular height of the wheel 82 above the bed 38 can be adjusted. A locking nut 106 is provided to secure the rod 102 in any adjusted position. It will be observed that the cylinder 84 occupies a position perpendicular to the bed 38, and therefore any adjustment of the wheel 82 is in this perpendicular direction.

An elongated slot 130 is formed in the cylinder 84, and a pointer 132 on the outside of the cylinder is connected to the ram 101 by a pin 134 passing through this slot. The pointer 132 co-operates with graduations 136 on the outside of the cylinder 84 to indicate the perpendicular height of the wheel 82.

A guide roller 108 is freely rotatable between arms 110 carried by brackets 112 projecting rearwardly from the bed 38. The connection between the arms 110 and the brackets 112 is by means of bolts and nuts, and there are slots in both the arms and the brackets which enable the position of the roller 108 relative to the bed 38 to be adjusted.

It has already been mentioned that the entire folder 14 is pivoted at 36 to the end of the moulding machine. A mechanism is provided for adjusting the angle of inclination of the bed 38 to the horizontal (see FIG. 3). A bifurcated lug 114 fixed to the underside of the bed is pivotally connected to a screw 116. The latter engages in a screw threaded socket 118 which is connected via a universal coupling 120 with a driven member 122. A rod 124 extends transversely of the dough moulder and is fitted with a knob 126 at each side where it is accessible to the operator. At the middle of the moulder the rod 124 passes through a bevel gear box 128 and is keyed into the driving gear (not shown). The driven gear is keyed on to the driven member 122.

If either of the knobs 126 is turned, the rod 124 turns also and through the bevel gears the driven member 122 and socket 118 are turned. Since the screw 116 cannot turn, it moves axially relatively to the socket 118 and this turns the folder 14 about its pivot 36.

In operation, when a cylindrical dough piece 100 (see FIG. 4) emerges from the scorer 24, it is necked and comprises four small portions a, b, c and d all of equal length, joined end-to-end. This dough piece emerges from the scorer 24, aligned with its longitudinal axis at right angles to the direction of movement of the belt 12.

The dough piece 100 then begins to slide down the top surface of the bed 38, but its movement is partially arrested by the wheel 82 which engages with the centre of the dough piece (i.e. at the midle "neck" between the small portions b and c). At about the same time, the ends of the end portions a and d engage with the converging inside walls 54 at the upper ends of the side boxes 52; thus the end portions are also arrested. Due to the slope of the bed 38, the four portions of the dough piece then begin to sag between the wheel 82 and each wall 54 to form a W shaped dough piece with each of the portions a, b, c and d forming one leg of the W, due to the force of gravity.

Eventually, the weight of the dough piece acting on the roller 82 is sufficient to rotate that wheel, and this allows the centre of the dough piece to move down the bed. The dough then slides between the paralllel sided portions of the walls, and the W formation is compressed to one in which the four portions a, b, c and d lie side-by-side, with their longitudinal axes turned through 90° from the formation in which they entered the folding machine 14.

The four dough portions are then free to slide over the roller 108 into the pan 16 for final proving and baking. The uncontrolled fall of the dough from the roller 108 is only through a short distance.

It wil be appreciated that it is important to prevent the dough sticking to any of the surfaces of the dough folder 14, and this is provided by fluidisation of the bed 38 and side boxes 50 and 52.

Referring now to FIG. 7, it will be seen that in this alternative arrangement, the wheel 82a is carried on the cylinder 84 in a fashion to that shown in FIG. 2. In this instance however, the wheel axle is hollow and a compressed air supply pipe 140 is connected to one end of the axle. There are co-operating ports inside the wheel and on the axle so that air under pressure can be supplied to holes 142 formed inwardly from the periphery of the wheel. The holes 142 are all radially inclined in the same sense, so that as the air escapes, it not only fluidises the periphery of the wheel, but it also rotates the roller, by jet reaction in the same direction as movement of the dough, to allow the dough to pass.

In FIG. 8, there is illustrated a third form of wheel 82b, which has recesses 144 formed in its sides. A compressed air supply pipe 146 has a nozzle 148 directed towards the wheel, so that the air escaping from it fluidises the wheel, and by impinging on the ends of the recesses 144 causes rotation of the wheel in the same direction as the embodiment shown in FIG. 7.

In the case of both of the embodiments shown in FIGS. 7 and 8, the wheel 82a or 82b is disposed as wheel 82 is in FIG. 3, with respect to bed 38.

We claim:

1. Apparatus for folding a generally elongated, cylindrically shaped plastic mass into a sinuous formation comprising:
   (a) means for scoring the mass at a center portion thereof and at points intermediate said center portion and the ends of the mass;
   (b) a conveyor for moving the mass beneath the scoring means, and having a discharge end; and
   (c) plastic mass folding means at said conveyor discharge end for folding the mass into a generally W-shaped sinuous formation comprising;
      (1) a bed for continuous movement of the mass in a direction generally opposed 90° to the length of the elongated mass;
      (2) rotatable means for retarding movement of the mass at said center portion; and
      (3) means for retarding movement of the mass at its ends, acting substantially simultaneously with said mass center portion retarding means and without stopping the movement of said mass ends;
   whereby portions of the mass intermediate of said mass center portion and said mass ends fold inwardly to produce a mass of generally W-shaped configuration.

2. The apparatus as recited in claim 1 wherein said said plastic mass folding means bed comprises a fluidised bed, including means defining rank and file spaced openings therein for fluid discharge whereby said mass is supported upon a fluid bed as it moves thereover.

3. The apparatus as recited in claim 1 wherein said bed is inclined, downwardly and away from said conveyor discharge end, whereby the plastic mass moves thereacross under the influence of the force of gravity.

4. The apparatus as recited in claim 1 wherein said bed further comprises means for adjusting the angle of inclination of said bed with respect to said conveyor.

5. The apparatus as recited in claim 1 wherein said means for retarding movement of the mass at said mass center portion comprise:
   (a) a wheel, located over the bed, and rotatable about an axis transverse to the direction of movement of the mass over the bed; and
   (b) means for mounting said wheel over the bed; whereby movement of the mass center portion over the bed is retarded by said wheel engaging the mass center portion as it passes therebeneath.

6. The apparatus as recited in claim 5 wherein said wheel further comprises means for rotating said wheel in the direction of movement of the mass center portion therebeneath, and for fluidising the mass center portion contacting periphery of the wheel.

7. The apparatus as recited in claim 6 wherein said means for rotating and fluidising the wheel periphery comprise:
   (a) means defining a plurality of holes in the wheel periphery, each being inclined in the direction of movement of the mass center portion therebeneath; and
   (b) fluid under pressure source means directed internally of the wheel to escape through said holes means.

8. The apparatus as recited in claim 6 wherein said means for rotating and fluidising the wheel periphery comprise:
   (a) means defining a plurality of recesses in at least one side wall of the wheel, said recesses being arranged concentrically within said wheel periphery;
   (b) a fluid pressure nozzle located above said wheel and positioned to direct fluid against said wheel periphery and recesses; and
   (c) fluid under pressure source means, directed to the nozzle.

9. The apparatus as recited in claim 5 wherein said means for mounting said wheel over the bed comprise
   (a) bracket means rotatably supporting the wheel; and
   (b) means for selectively positioning said wheel towards and away from said bed.

10. The apparatus as recited in claim 9 wherein said means for selectively positioning said wheel comprise:
    (a) a stationary cylinder fixed over the bed and having its long axis arranged perpendicularly to the bed;
    (b) a ram, slidable within the cylinder said wheel bracket mounted thereon; and
    (c) screw thread and lock means extending through the upper end of the cylinder, for selectively positioning the ram therewithin.

11. The apparatus as recited in claim 1 wherein said plastic mass ends retarding means further includes means for compressing the generally W-shaped sinuous mass formation into a mass of substantially adjacent, parallel cylindrical mass portions.

12. The apparatus as recited in claim 11 wherein said retarding means and said compressing means comprise;
    (a) a pair of converging side walls on the mass folding means bed having initial ends disposed apart a distance at least equal the length of the plastic mass and terminal ends disposed apart a distance less than the separation of the initial wall ends whereby the mass ends are retarded as they move along the bed;
    (b) a pair of compressing walls, located at the converging wall terminal ends, and disposed generally parallel to the direction of movement of the plastic mass over the bed.

13. The apparatus as recited in claim 12 wherein said converging side walls and said compressing walls comprise fluidised surfaces, including
    (a) means defining rank and file spaced openings in said walls; and
    (b) a source of fluid under pressure behind said walls for ejecting fluid through said openings into the path of travel of a plastic mass moving thereby.

References Cited

UNITED STATES PATENTS

| 2,104,205 | 1/1938 | Menapace et al. | 107—69 |
| 2,740,362 | 4/1956 | Elliott | 107—69 |
| 2,756,459 | 7/1956 | Kellner | 107—69 |
| 3,507,227 | 4/1970 | Pickles | 107—9 |

FOREIGN PATENTS

| 835,240 | 5/1960 | Great Britain | 107—9 |

HENRY S. JOUDON, Primary Examiner

U.S. Cl. X.R.

107—68